July 18, 1967 W. C. ABELLI 3,331,459
BEAM SCALE WITH FLUID BALANCE/INDICATOR
Filed June 8, 1966

INVENTOR
William C. Abelli
BY John A. Mawhinney
ATTORNEY

United States Patent Office 3,331,459
Patented July 18, 1967

3,331,459
BEAM SCALE WITH FLUID BALANCE/INDICATOR
William C. Abelli, East Winthrop, Maine, assignor of fifty percent to Thomas L. Eggleston, Jr., Fort Lauderdale, Fla.
Filed June 8, 1966, Ser. No. 556,825
10 Claims. (Cl. 177—201)

This invention relates to a weighing scale and aims to provide an extremely simple and inexpensive construction which may be made in a minimum number of parts and primarily, though not necessarily, from any suitable plastic material.

A prime object is to provide such a scale wherein a beam or balance arm is normally in an angular position relative to the horizontal and carries a fluid or liquid which moves therein to coact with graduations thereon to indicate the weight of matter disposed on the beam in response to changes in angularity of the beam caused by such weight.

A second object is to provide a scale having a balance beam equipped on opposite sides of its fulcrum with a bulb and a platform, the beam having a longitudinal bore or passage communicating with the bulb in combination with a fluid observable through the beam arranged to flow to and from the bulb and passage and relative to indications on the beam dependent on changes in the angularity of the beam caused by the weight of material supported on the platform.

Another object is to provide in a weighing scale, a balance beam to support material to be weighed and which beam contains a movable weight-indicating liquid, which beam is balanced and arranged to be normally moved through various angular positions according to weight of materials supported thereby, so that liquid may move to and from weight-indicating positions.

A further object is to provide such a scale having means carried by the beam operable to adjustably balance it and bracket means pivotally mounting the beam and usually carried by a base.

Still further, an object is to provide the bulb of the beam with a laterally enlarged space so as to carry a sufficient quantity of the liquid to indicatingly cooperate with the graduations or indications at the various angles desired.

In accompanying drawings illustrating one form of the invention,

Figure 1:
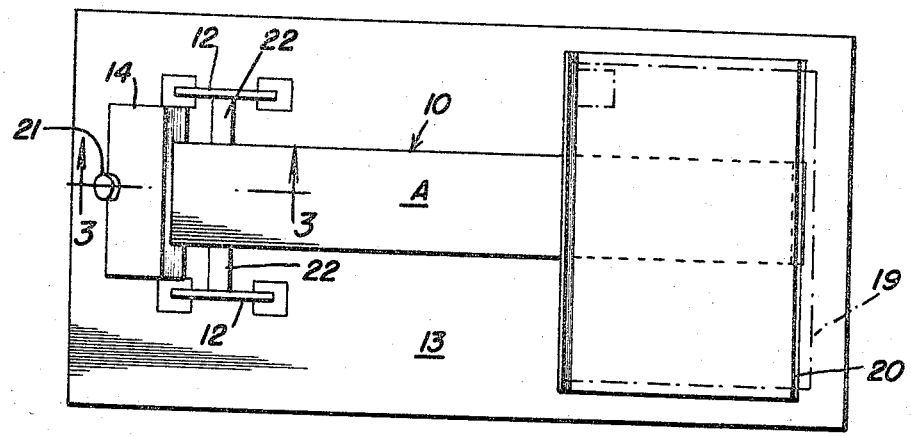
FIGURE 1 is a plan view of the scale.

Referring specifically to the drawings, A designates a beam means comprising a balance beam or arm 10 which is pivotally mounted as on a horizontal axis 11 in any suitable manner as by means of brackets 12 or any equivalent anchored to a portable base 13. Said beam 10 at its lower end is equipped with a hollow bulb 14 having a collar 15 about an opening 16 and which collar is interfitted in the adjacent end of beam 10 with all contiguous surfaces of the bulb and beam 10 suitably sealed fluid tight. Beam 10 has a longitudinal bore or passageway 17 which communicates with the interior of the bulb 14 through opening 16.

Within the bulb 14 is a suitable quantity of indicating fluid such, for example, as water, spirits, oil, alcohol, mercury, etc., as indicated at 18. Along the beam 10 are suitable scale graduations or weight indications, numbered if preferred, for instance the lowest one at zero (0) and the preferably 36 others progressively increasing in height from zero (0) and relative to the angle of the beam. Said indications or graduations may, for instance, be representative of quarter ounces. The material to be weighed such as matter 19 suggested in dotted lines may rest on a platform 20 carried by the beam.

Figure 2:
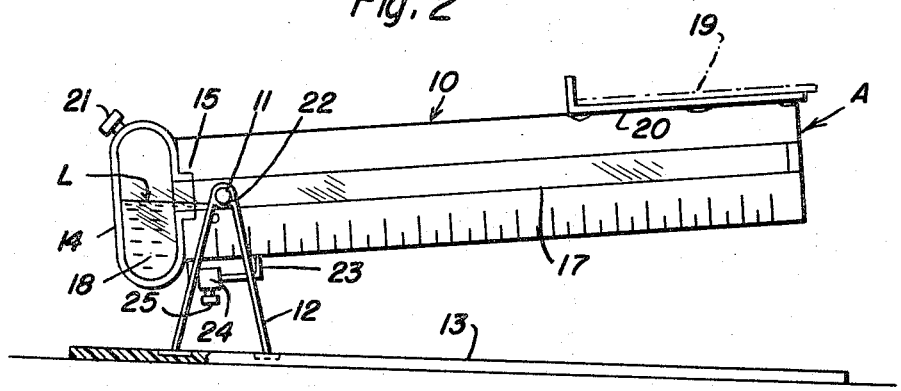
FIGURE 2 is a side elevation of the scale showing the parts in normal position with material to be weighed suggested in dotted lines.
Figure 3:
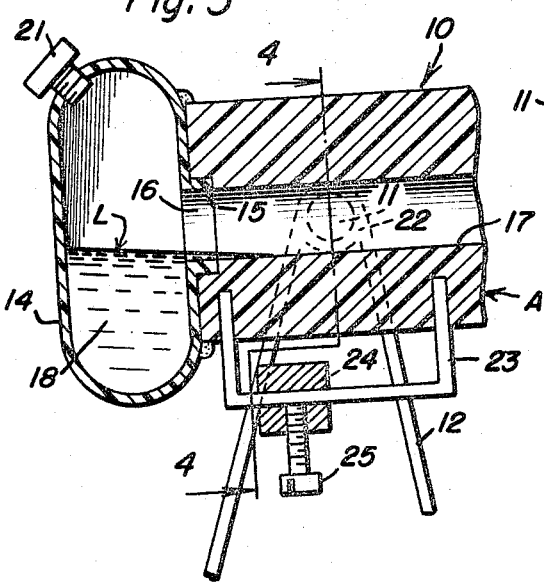
FIGURE 3 is an enlarged vertical section taken on the line 3—3 of FIGURE 1.
Figure 4:
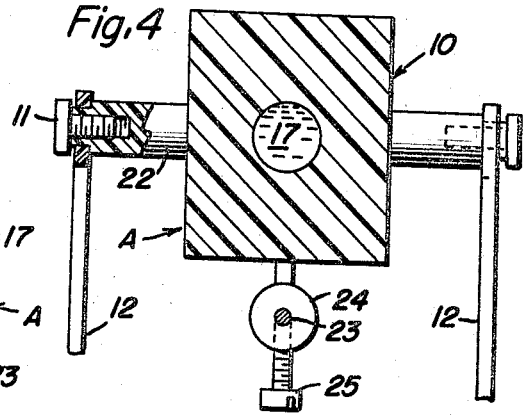
FIGURE 4 is a cross-sectional view taken on the plane of line 4—4 of FIGURE 3.

The beam 10 with platform 20 and the quantity of fluid 18 in the beam are so related and balanced that the level L of fluid 18 intersects or extends to the zero (0) indication when the beam 10 is in the normal or position as shown in FIGURES 2 and 3 of the drawings. At 21 a closure screw for a filling opening to the bulb 14 is indicated and the fit is sufficiently loose that a vent results so that the air is provided to enable fluid 18 to freely flow and in addition a further air vent may be provided as at the upper end of passageway 17 if desired.

The axis at 11 for the beam 10 is, for instance, that of trunnions 22 formed integral with the beam 10 and journaled in the brackets 12.

Depending from the beam 10 and intersected by a vertical line passing through the trunnions is a bracket 23 on which a counter weight 24 is fastened by a set screw 25 so as to be adjustably slidable to rectify any imbalance of the beam 10, its contents and parts movable therewith.

It will be realized that all the parts of the instant scale may be made of any desired material and, for instance, plastic, which will be light in weight and may be wholly or partially transparent or translucent if desired.

In use the beam means A is balanced at the angle shown wherein the level of fluid 18 registers or intersects the zero mark (0) delineated on the beam 10 and the beam 10 is sufficiently transparent or translucent at least at a portion thereof so that the fluid within the passageway 17 may be observed through the beam in co-action with the zero mark (0) and additional calibrations or weight indications. The matter 19 to be weighed is placed on the platform 20 which tilts the beam downwardly toward the plane of its axis 22 which disposes the material 19 nearer the horizontal so that the bulb and fluid 18 will be raised and moved in passage 17 in the direction of the platform 20 to register with the proper indication to the right of zero mark (0) conforming to its weight.

Various changes may be resorted to provided they fall within the spirit and scope of the invention.

What is claimed is:

1. A measuring scale having a pivotally mounted beam means, an indicating fluid at one side of the pivotal mounting balancing said beam means in a position inclined to the horizontal, and said beam means on the other side of its pivotal mounting being depressible by material being weighed to enable movement of said fluid from a zero position to a weight-indicating position.

2. A measuring scale according to claim 1 wherein said pivotal mounting comprises trunnions on opposite sides of said beam means furnishing said pivotal mounting, and supporting means in which said trunnions are journaled.

3. A weighing scale according to claim 1 wherein said beam is light penetrable to enable observation of the travel of said fluid.

4. A measuring scale having a pivotally mounted beam, an indicating fluid balancing said beam means in a position inclined to the horizontal, said beam means on one side of the pivotal mounting being depressible by material being weighed to enable movement of said fluid from a zero position to a weight-indicating position, said beam means consisting of a beam having a longitudinal passageway in which said fluid moves, and a bulb adjacent one end of said beam to and from which said fluid moves.

5. A measuring scale according to claim 4 wherein said pivotal mounting is closer to said bulb than to the other end of said beam.

6. A measuring scale according to claim 3 wherein a platform to hold material to be weighed is carried by said beam on the other side of and remote to said pivotal axis.

7. A measuring scale according to claim 4 wherein said bulb has an interfitted connection with said beam and said fluid is passable through said connection to and from said passageway and bulb.

8. A weighing scale according to claim 4 wherein said beam is of plastic.

9. A weighing scale according to claim 1 having an adjustable rectifying weight means carried by said beam means below, adjacent to and bridging the pivotal axis of the pivotal mounting.

10. A weighing scale according to claim 4 wherein trunnions are provided on opposite sides of said beam to furnish said pivotal mounting, supporting means in which said trunnions are journaled, said beam and bulb being of plastic material, said beam being light-penetrable to enable observation of the movement of said fluid, said bulb having a filling opening, a loose fitting closure for the latter and an adjustable rectifying weight means carried by said beam below and adjacent said pivotal mounting.

References Cited

UNITED STATES PATENTS

| | | | |
|---|---|---|---|
| 1,880,436 | 10/1932 | Haskins | 177—164 |
| 2,577,100 | 12/1951 | Alvarez | 177—254 X |

RICHARD B. WILKINSON, *Primary Examiner.*

GEORGE H. MILLER, JR., *Assistant Examiner.*